May 13, 1952 J. C. STEVENS 2,596,305

RECORDING INSTRUMENT

Filed Sept. 25, 1950 3 Sheets-Sheet 1

INVENTOR.
JOHN C. STEVENS
BY Buckhorn and Cheatham
Attorneys

INVENTOR.
JOHN C. STEVENS
BY *Buckhorn and Cheatham*
Attorneys

May 13, 1952 J. C. STEVENS 2,596,305

RECORDING INSTRUMENT

Filed Sept. 25, 1950 3 Sheets-Sheet 3

INVENTOR.
JOHN C. STEVENS
BY Buckhorn and Cheatham
Attorneys

Patented May 13, 1952

2,596,305

UNITED STATES PATENT OFFICE 2,596,305

RECORDING INSTRUMENT

John C. Stevens, Portland, Oreg., assignor to Leupold & Stevens Instruments, Inc., Portland, Oreg., a corporation of Oregon Application September 25, 1950, Serial No. 186,537

1 Claim. (Cl. 73—292)

My present invention relates to instruments for recording two variable conditions on the same record sheet. The present invention is of particular utility in hydrographic surveys and comprises means to create a permanent record of both of the variable factors of water levels and temperatures on one record sheet instead of on two record sheets as has usually been the case heretofore. It is recognized that instruments have heretofore been devised for producing graphs of two variable conditions on the same sheet by the use of two scribing elements operating upon laterally spaced portions of the record sheet, but the present invention is designed further to reduce the cost of the recording mechanism and to reduce the size of the space required to store recordings by having two scribing elements which operate at times upon the same portion of a single record sheet of relatively narrow width. Accordingly, the principal object of the present invention is to provide an instrument of the foregoing character including two scribing elements for creating graphs of two variable conditions correlated to time on a record sheet, both of which scribing elements are operable upon the same time element of the record sheet, at least one of which scribing elements is capable of movement from one extreme edge portion to the other extreme edge portion of the record sheet, and which instrument includes means for causing one of the scribing elements to be lifted over the other whenever their paths of movement cross.

The present invention may incorporate at least one set of carriage reversing mechanisms of the type disclosed and claimed in my previous Patent No. 2,000,046, dated May 7, 1935, whereby the scribing element which completely traverses the record sheet may reverse itself while continuing to indicate an increase or decrease in the condition being recorded as distinguished from a reversal of movement occuring when the scribing element is at an intermediate portion of the sheet and indicating a reversal in the direction of movement of the condition being recorded. The present invention likewise comprises an improvement upon a recording instrument employing a clockwork or other mechanism for advancing a record sheet at a uniform rate as disclosed in the aforesaid patent.

A further object of the present invention is to provide an improved temperature recording mechanism particularly for the purpose of recording water temperatures in a stream of widely varying surface elevation whereby the recording instrument may be safely mounted at an elevation above the extreme height of the stream while the temperature sensing element may be immersed in the stream below the minimum water level thereof, without having the temperature of the air surrounding the recording instrument affect the resulting temperature graph.

The foregoing and other objects and advantages of the present invention may be more readily ascertained by inspection of the following specification taken in connection with the accompanying drawing wherein like numerals refer to like parts throughout, while the features of novelty will be more distinctly pointed out in the appended claim.

Figure 1:
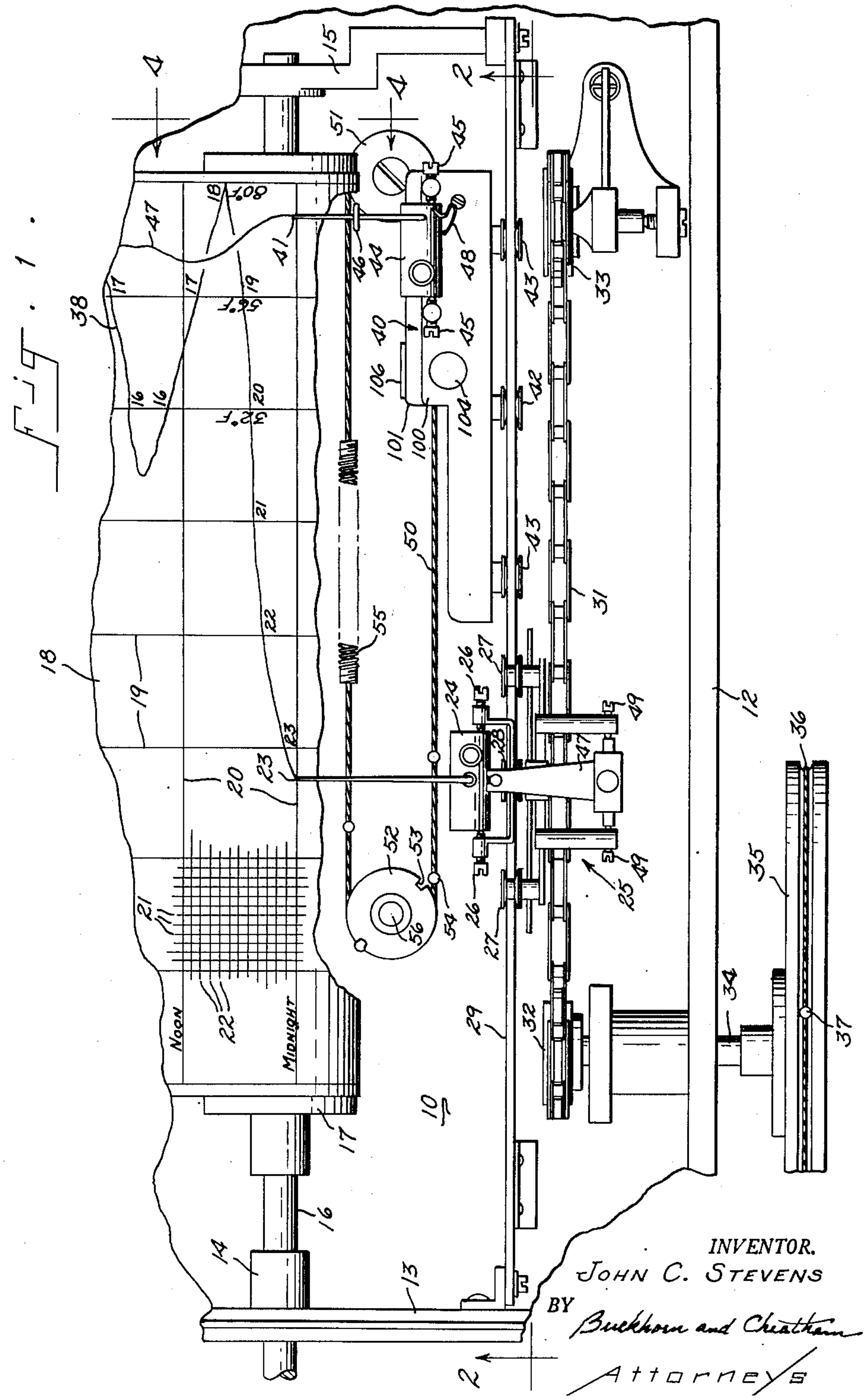
Fig. 1 is a plan view, with parts broken away, of the recording instrument showing the pair of scribing elements making a record of two variable conditions on the same record sheet.
Figure 2:
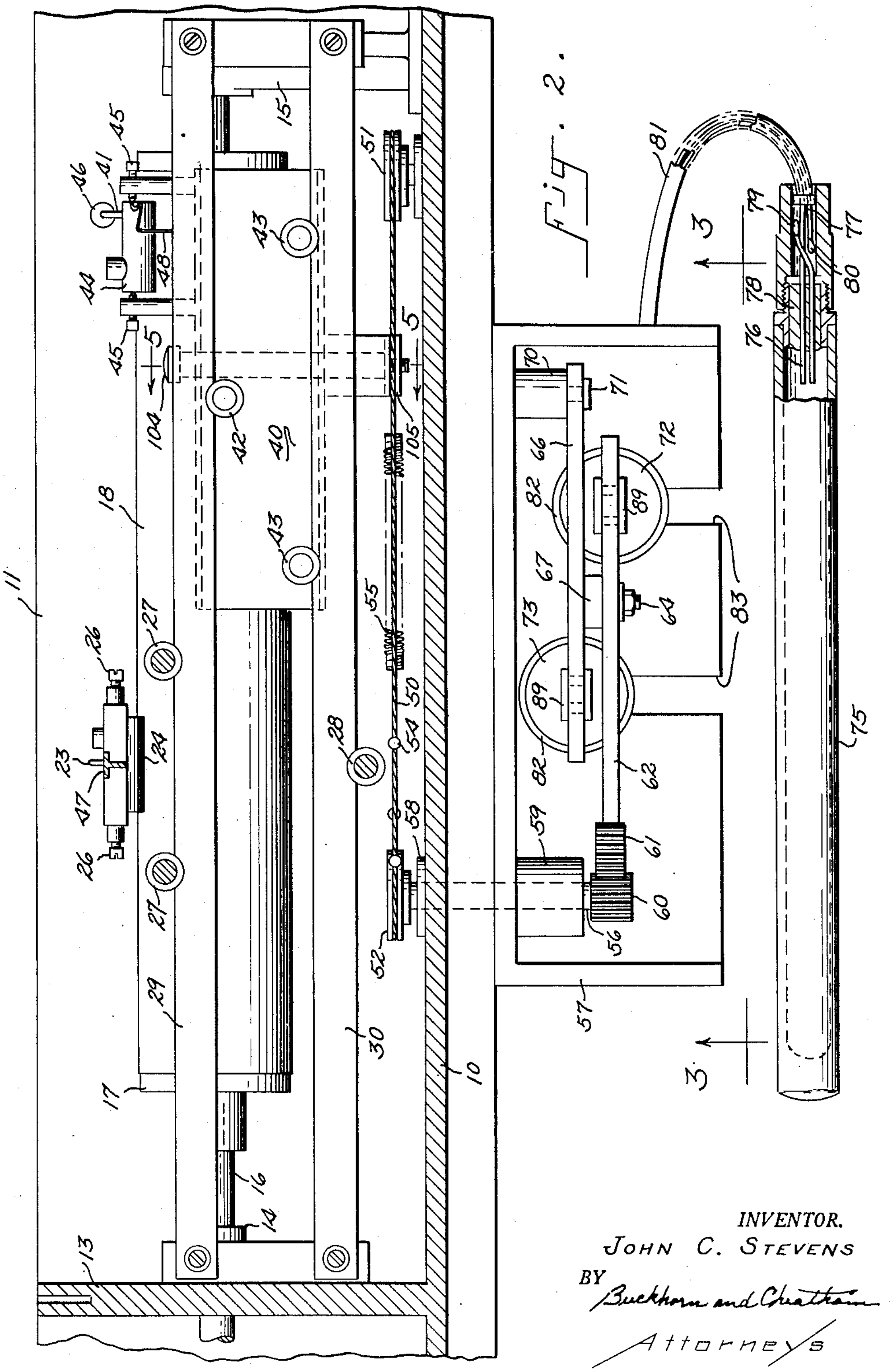
Fig. 2 is a vertical section taken substantially along line 2—2 of Fig. 1.
Figure 3:
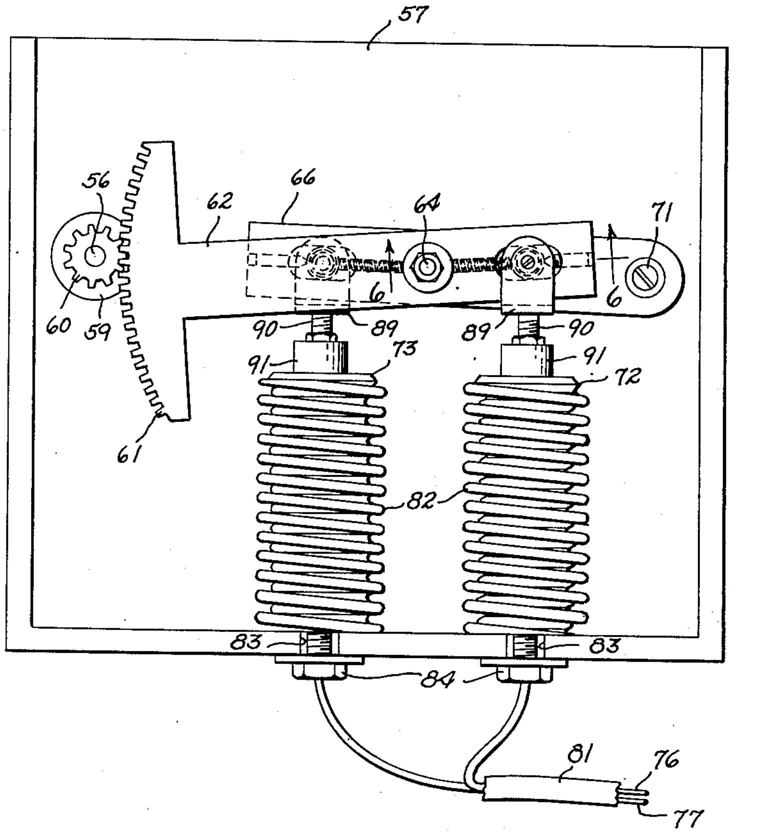
Fig. 3 is a horizontal section taken substantially along line 3—3 of Fig. 2.

The instrument as presently conceived comprises a housing including a bottom wall 10, side walls 11 and 12, end walls (not shown) and an intermediate partition 13. A suitable removable cover (not shown) may be associated with the housing to protect the recording instrument from the weather. A bearing sleeve 14 mounted on the partition 13 and a bearing bracket 15 mounted on the bottom wall 10 journal the shaft 16 of a roller 17 comprising one of the rollers of a plurality of record sheet feeding rollers, the balance of which are not shown and details of which may be readily ascertained from the above-mentioned patent. The shaft 16 extends through the partition 13 and is associated with clockwork mechanism (not shown) as disclosed in the aforementioned patent, or other equivalent means for advancing the record sheet at a uniform rate. The record sheet is indicated at 18 and preferably is in the form of a roll of graph paper having longitudinal major lines 19 indicating the major units of a condition to be recorded and transverse major lines 20 indicating the major units of time, such as noon and midnight of each day. The paper is preferably provided with a plurality of minor longitudinal lines 21 indicating increments of the condition to be recorded and minor transverse lines 22 indicating increments of time such as the hours of the day. In the example given in Fig. 1 the major lines 19 indicate feet of water level elevation and the minor lines 21 indicate inches of each foot, throughout the entire width of the record sheet, while the last three major lines 19 at the right also indicate temperature recordings of 32° F., 56° F., and 80° F., respectively, in which case the minor lines would also indicate increments of temperature of two degrees Fahrenheit each.

As more fully detailed in the above-mentioned patent, the instrument comprises a scribing element 23 which extends from a refillable ink reservoir 24 pivotally mounted upon a carriage generally indicated at 25 by means of a pair of adjustable pivot screws 26. The pen and ink container are mounted off center so that the weight thereof will cause the point of the pen to rest upon the record sheet as it traverses the upper surface of the roller 17. The carriage comprises a plurality of flanged wheels 27 and 28 which engage the upper and lower edges respectively of an upper guide rail 29 and a lower guide rail 30 mounted in the frame in parallel relation to the axis of the roller 17. The carriage is suitably connected to a sprocket chain 31 which passes about a drive sprocket 32 and a spring tensioned idler sprocket 33 whereby movement of the carriage transversely with respect to the direction of movement of the record sheet may be accomplished. The sprocket 32 is connected to a shaft 34 which extends through the front wall 12 and is fastened to a sheave 35 provided with a groove having spaced sockets therein for reception of a cable 36 having spaced antislipping beads 37 thereon, each of which is receivable in one of the sockets in the sheave so as to cause the carriage 25 to move in exact relation to movement of the cable 36. The cable 36 is connected to a movable member for sensing a variable condition, such as a float resting on the surface of water in a well openly communicating with a variable stream, and to a suitable counterweight as disclosed in the above-mentioned patent. It is to be appreciated that the relative dimensions of the sheave 35 and the sprocket 32 are preferably such that a large unit of movement of the cable results in a considerably reduced unit of movement of the carriage, i. e., in the example given, a one foot movement of the water level float results in approximately one inch movement of the carriage. It is also to be appreciated that the carriage 25 could move in one direction only to record rising water levels and in the opposite direction only to record falling water levels, but that the size of the instrument may be considerably reduced by having the carriage 25 automatically reversible through reversing means such as disclosed and claimed in the above-mentioned patent. By such means a record sheet of relatively narrow width may be utilized to record water levels between widely separated maximum and minimum limits. It will be observed that the graph 38 scribed by the pen 23 indicated a falling water level in the early morning, with the water level again rising at approximately six a. m., and at approximately five o'clock in the afternoon the water level had reached eighteen feet and was still rising. Therefore, the carriage 25 had automatically reversed and continued to indicate rising water level to the instant movement at midnight when the water had exceeded twenty-three feet. The reversal of the graph line occurring at the edge portion of the record sheet indicates that the condition is still moving in the same direction whereas the previous reversal of the graph at an intermediate portion of the sheet indicates a reversal in the condition being recorded.

In accordance with the present invention further compactness of the recording instrument and reduction in size and number of record sheets is achieved by having a second carriage 40 supporting a second pivotally mounted scribing element or pen 41 contained within the same housing, the carriage being supported by an upper flanged wheel 42 and a pair of lower flanged wheels 43 engaging the lower and upper edges respectively of the rails 29 and 30, the carriage being disposed on the opposite side of the rails whereby one carriage may pass the other without interference. The carriage 40 may traverse any portion or all of the record sheet space, but for the present illustration need only traverse sufficient space accurately to record temperature variations between 32° F. and 80° F., representing the absolute minimum and beyond the absolute maximum teperatures which the water of the stream may achieve. The scribing element 41 operates upon the same transverse or time element of the record sheet as the pen 23 at any given instant whereby both conditions of water level and stream temperature are correlated with respect to time. The pen 41 extends from an ink reservoir 44 pivotally mounted off center upon a pair of adjustable screw pivots 45 so as to rest upon the record sheet at all times when in use. In order that the overlapping movements of the carriages may be accommodated, one of the scribing elements is provided with means to lift the other scribing element thereover when their paths of movement cross. In this case the means is mounted upon the scribing element 41 and comprises a small annular flange 46 concentrically surrounding a portion of the stem of the pen 41. The flange 46 is engaged by an intermediate portion of the stem of pen 23 to lift the pen 23 over the pen 41. The breaks in continuity of the water level graph 38 as it traverses the temperature graph 47 are indicated in Fig. 1 and are self-explanatory to the reader of the record.

In order that the pens may be held in raised positions without spilling ink from the containers the carriage 25 is provided with a slotted rest arm 47 engageable with the pen 23 when it is tipped back over center, and the carriage 40 is provided with a hooked, upright wire 48 similarly engageable with the pen 41. The arm 47 is preferably mounted on adjustable screw pivots 49 in order that it may be tipped back out of the way when necessary. The wire 48 is so arranged that the container 24 may pass behind it when the carriage 25 passes the carriage 40.

Any suitable means responsive to a second variable condition to be recorded, such as stream temperature, may be utilized to move the carriage 40. In the present instance the motive force is applied through a cable 50 maintained in taut condition about an idler sheave 51 and a driven sheave 52, the sheaves having peripheral grooves for the reception of the cable and the sheave 52 having peripheral slots 53 for reception of antislipping beads 54 fixed to the cable 50, and the cable being maintained in taut condition by a spring 55 connecting the adjacent ends thereof.

The sheave 52 is fixed to a vertical shaft 56, extending into an auxiliary housing 57 mounted beneath the bottom wall 10, and the shaft is journaled in suitable bearing members 58 and 59. The housing is preferably provided with a removable cover (not shown).

The lower end of shaft 56 carries a pinion 60 which meshes with a sector gear 61 mounted on one end of a first lever 62. The lever 62 is pivotally mounted at an intermediate point on a spacer collar 63 surrounding a stud 64 projecting from a pivot member 65 pivotally mounted in a second lever 66, the pivot member having an enlarged flange 67 thereon for holding the two levers in spaced, parallel relation to each other, and the lever 62 being retained by a washer 68 and nut 69 on the projecting end of the stud 64. The second lever 66 is pivotally mounted on the outer end of a boss 70 depending from the upper surface of the housing 57 and is retained thereon by a removable pivot stud 71. The first lever 62 is pivotally connected at the end opposite the sector gear 61 to an expansible bellows device 72 and the second lever 66 is connected at the end opposite the pivot 71 to a similar expansible bellows device 73. Expansion of bellows 72 tends to rock the sector gear 61 in one direction and expansion of the bellows 73 tends to rock the sector gear in the opposite direction. If the lever arm ratios are properly adjusted, equal expansion of both bellows will be nullified by the compensating device thus provided so that the sector gear and the carriage 40 will remain stationary.

In order that the temperature of a medium being observed, such as a stream of water, may be accurately recorded, one of the bellows is connected to a thermosensitive element, the preferred construction comprising a metal bulb 75 filled with a thermosensitive fluid, the bulb 75 communicating through a fine tube 76 with bellows 73. The tube 76 is preferably of considerable length so that the recording instrument may be safely mounted above the maximum stream level and the bulb 75 immersed in the stream below the minimum stream level. Therefore, a considerable length of the tube 76 may be subjected to the temperature of the surrounding air and would cause an appreciable error in the recorded temperature if it were not for the correcting mechanism including the bellows 72. The bellows 72 is connected to a second tube 77 of substantially the same length as the tube 76, which is initially inserted into the bulb 75 through the plugging device thereof generally indicated at 78. After the bulb 75, the two bellows 72 and 73, and the two tubes 76 and 77 are fully charged with a thermosensitive fluid the tube 77 is pinched off and its ends sealed at the bulb 75 as indicated at 79 and 80. The bellows 72 will thus be affected by the temperatures existing between the bulb 75 and the recording instrument, thus causing expansion and contraction of the bellows 72 to the same extent that bellows 73 is affected by the temperature or temperatures of the intervening space. The two bellows and the two levers constitute a differential mechanism for canceling the error introduced by reason of the long tube 76 filled with thermosensitive fluid. In order that each of the two tubes may be subjected to exactly the same conditions, and to protect the tubes against rough handling, they are preferably maintained in side-by-side relation in a suitable sheath 81, the sheath preferably being formed of a spirally wound, interlocked edge, metal strip which cannot be kinked or too tightly coiled. Each of the bellows is preferably mounted within the convolutions of a coil spring 82 which protects the bellows as well as aids in causing positive reaction to the expansion and contraction of the fluid. Each is mounted in a slot 83 in a wall of the housing 57 by a stud 84.

Figure 6:
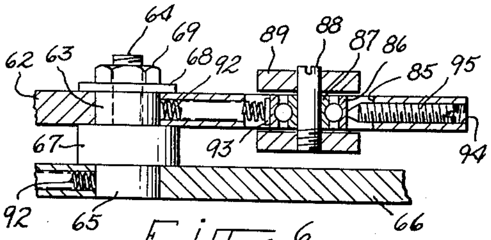
Fig. 6 is a section, on an enlarged scale, taken substantially along line 6—6 of Fig. 3.

In order that the instrument may be calibrated, and to provide for extreme sensitivity thereof, each of the bellows is connected to its corresponding lever through adjustable antifriction means of which one is indicated in Fig. 6. The lever is provided with an elongated, longitudinal slot 85 in which is snugly fitted the outer raceway 86 of a ball-bearing assembly including a plurality of ball bearings and an inner raceway 87. The inner raceway is mounted upon a stud 88 extending between the arms of a clevis 89 from which a stud 90 extends into the threaded end piece 91 of the bellows. The arm 62 is also provided with a smooth longitudinal bore interconnecting the slot 85 with the opening in which the pivot member 63 is situated, in which is mounted a compression spring 92 bearing against a shoe 93 positioned against the outer surface of the outer raceway 86. The outer end of the arm 62 is provided with a threaded, longitudinal opening 94 in which is mounted an adjusting screw 95 bearing against the opposite side of the outer raceway 86. Adjustment of the effective lever arm is achieved by adjusting the screw 95 against the compression of spring 92. Such adjustment is achieved at the factory by immersing the bulb 75 in water at several known temperatures, and observing the resulting graph produced by the scribing element 41.

Figures 4, 5:
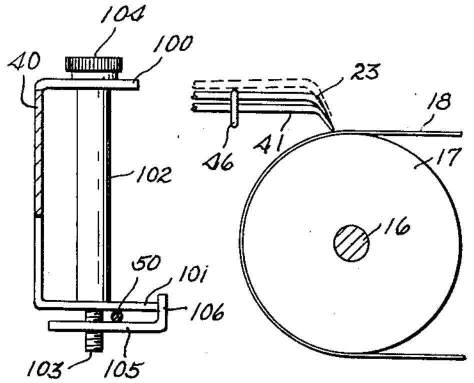
Fig. 4 is a vertical section taken substantially along line 4—4 of Fig. 1.
Fig. 5 is a vertical section taken substantially along line 5—5 of Fig. 2.

In order to safeguard the instrument during shipment from place to place the carriage 40 is preferably detachably connected to the cable 50 by means illustrated in Fig. 5. In this figure it is seen that the carriage 40 includes upper and lower horizontally projecting flanges 100 and 101 respectively, the flange 100 being provided with a large opening for reception of the relatively large stem 102 of a stud and the flange 101 being provided with an opening for reception of a reduced threaded end 103 thereof. The upper end of the stem 102 is provided with a knurled head 104 engageable by the fingers of the operator. The threaded reduced portion 103 engages a horizontal clamping plate 105 having a vertical, upwardly projecting flange 106 thereon engageable with the front edge of the flange 101. The stem 102 may be rotated to loosen or tighten the clamping member 105 with respect to the flange 101 in order that the carriage may be clamped to the cable 50. When the instrument is being shipped from place to place the clamp 105 is loosened since the bulb might be subjected to greater heat than would be encountered in use at a stream recording station. When the instrument is set up at its position of use the bulb 75 is immersed in the stream, or any other medium of which the exact temperature is known, and the carriage clamped to the cable with the scribing instrument 41 at the correct temperature line.

It is to be appreciated that one or the other of the pens may be caused to move over the other pen, as indicated in Fig. 4, but that it is preferable to elevate that one of the pens which travels the width of the recording sheet since its movement is more likely to be in a direction parallel to the axis of the roller 17. It is also to be appreciated that various sheaves of different sizes may be substituted for the sheave 35 so as to create different ratios of movement of the scribing carriage. Likewise, different sizes of sheaves 51 and 52 may be substituted for those illustrated so as to cause the carriage 40 to move to other extents for each increment of temperature change. Likewise, the speed of movement of the record sheet feeding mechanism may be altered so as to have larger or smaller time increments on the record sheet.

It is to be appreciated that the example shown is not limited since many different types of charts may be devised. One form of chart, for example, may have ten minor lines in one direction representing tenths of feet, while the minor lines in the other direction may be as illustrated. Similarly, various different types of charts may be required for measuring other factors and the major and minor lines would be altered to suit the circumstances.

It is also to be appreciated that the principles involved may be incorporated in other types of recording mechanisms as long as the two scribing instruments operate on the same time element of the chart or record sheet.

Having illustrated and described a preferred embodiment of my invention, it should be apparent to those skilled in the art that the invention permits of modification in arrangement and detail. I claim as my invention all such modifications as come within the true spirit and scope of the appended claim.

I claim:

In a stream recorder, a first recording pen, a first carriage supporting said first recording pen, a stream temperature sensing bulb filled with a thermosensitive fluid, a first expansible member associated with said first carriage for causing movement of said carriage in accordance with fluctuations in temperature of the stream, a first tube openly communicating with said bulb at one end and with said expansible member at its other end, said tube being of considerable length whereby the recording instrument may be placed safely above the maximum stream level and said bulb may be placed in the stream below the extreme minimum level thereof, a second tube filled with the same thermosensitive fluid, said second tube having a closed end and extending substantially from end to end of said first tube, a second expansible member adjacent said first expansible member, the open end of said second tube being in communication with said second expansible member, compensating means connecting said expansible members to said carriage including a pair of oppositely movable elements individually associated with said expansible members whereby the effect of temperature of the air traversed by said tubes is eliminated, a second recording pen, a second carriage supporting said second recording pen, means operatively associated with said second carriage for moving said second carriage in accordance with fluctuations in water level of the stream, said second recording pen being movable from one side to the other of said first recording pen, means for moving a record sheet transversely with respect to the direction of movement of said carriages, said carriages being movable along parallel paths and said recording pens being operable at any instant on the same transverse element of said record sheet, and means for elevating one of said recording pens over the other whenever their paths of movement cross.

JOHN C. STEVENS.

REFERENCES CITED

The following references are of record in the file of this patent:

UNITED STATES PATENTS

| Number | Name | Date |
|---|---|---|
| 495,815 | Lewis | Apr. 18, 1893 |
| 1,163,279 | Stevens | Dec. 7, 1915 |
| 1,494,034 | Stevens | May 13, 1924 |
| 1,558,828 | Brace | Oct. 27, 1925 |
| 1,846,705 | Beck | Feb. 23, 1932 |
| 2,000,046 | Stevens | May 7, 1935 |
| 2,037,409 | Duvander | Apr. 14, 1936 |
| 2,050,965 | De Giers | Aug. 11, 1936 |
| 2,358,047 | Birch | Sept. 12, 1944 |

FOREIGN PATENTS

| Number | Country | Date |
|---|---|---|
| 225,474 | Great Britain | Dec. 4, 1924 |